United States Patent [19]
Nagazumi et al.

[11] 3,850,447
[45] Nov. 26, 1974

[54] VEHICLE OCCUPANT RESTRAINT DEVICE

[75] Inventors: Yasuo Nagazumi, Tokyo; Kenichi Mori, Yokohama, both of Japan

[73] Assignee: Nissan Motor Company Limited, Yokohama, Japan

[22] Filed: July 9, 1973

[21] Appl. No.: 377,267

[30] Foreign Application Priority Data
July 10, 1972  Japan.............................. 47-80547
July 10, 1972  Japan.............................. 47-80548

[52] U.S. Cl............................................ 280/150 B
[51] Int. Cl............................................ B60r 21/04
[58] Field of Search.................. 280/150 B; 180/90; 188/1 C, 1 B

[56] References Cited
UNITED STATES PATENTS

| | | | |
|---|---|---|---|
| 3,105,702 | 10/1963 | Larson | 280/150 B |
| 3,439,769 | 4/1969 | Brilmyer | 180/90 |
| 3,560,020 | 2/1971 | Barenyl | 280/150 B |
| 3,774,713 | 11/1973 | Stegmaier | 180/90 |

*Primary Examiner*—Stanley H. Tollberg

[57] ABSTRACT

A vehicle occupant restraint device for a motor vehicle in which a shock absorbing member is connected to a frame member of the motor vehicle and secured to an impact receiving member adapted to receive impact force of a vehicle occupant whereby, when an impact force greater than a predetermined value is applied thereto, the shock absorbing member is deformed to absorb energy of impact of the vehicle occupant.

3 Claims, 8 Drawing Figures

VEHICLE OCCUPANT RESTRAINT DEVICE

This invention relates in general to a protective device for an occupant of a vehicle and, more particularly, to a vehicle occupant restraint device for absorbing kinetic energy from the vehicle occupant to protect the vehicle occupant from injury during a collision of the vehicle.

It is well known to provide a safety seat belt arrangement in which a seat belt is employed to prevent an occupant or occupants of a vehicle from being thrown forward or injured in case of an accident or collision of vehicle. The safety seat belt is usually held in a retracted position so that it is necessary to fasten and unfasten the seat belt whenever the occupant enters or leaves a passenger compartment of the vehicle thus requiring troublesome manipulation by the vehicle occupant. Furthermore, the safety seat belt gives only limited protection to the vehicle occupant when the vehicle is involved in a high speed collision because the vehicle occupant is necessarily subjected to an undesirable force by the seat belt due to his inertia. Safety air bags that are commonly used in vehicles are complicated in construction and expensive to manufacture. These safety air bags are also inadvantageous in that they are liable to be operable even when the vehicle encounters a slight shock during cruising on an irregular road surface. To overcome these shortcomings encountered in prior art protective devices, it has heretofore been proposed to have the vehicle equipped with a deformable safety structure for absorbing kinetic energy from the vehicle occupant during a collision of the vehicle. However, such a prior art deformable structure does not satisfactorily absorb energy from the vehicle occupant during a collision due to its inherent construction.

It is, therefore, an object of the present invention to provide a new and improved restraint device for use in a vehicle.

Another object of the present invention is to provide a vehicle occupant restraint device which is mounted on an interior part of a vehicle, and which is capable of protecting an occupant or occupants of the vehicle during a collision.

Another object of the present invention is to provide a vehicle occupant restraint device which restrains an occupant against movement during a collision of a vehicle.

Still another object of the present invention is to provide a vehicle occupant restraint device which is deformably secured to an interior part of a vehicle and which sufficiently absorbs kinetic energy from a vehicle occupant during a collision of the vehicle.

Still another object of the present invention is to provide a vehicle occupant restraint device for absorbing energy of impact of a vehicle occupant against a structural part of the vehicle during a collision.

A further object of the present invention is to provide a vehicle occupant restraint device which can be readily mounted on an interior part of a vehicle.

A further object of the present invention is to provide a vehicle occupant restraint device which is simple in construction and economical to manufacture.

In general, these and other objects of the present invention can be achieved by a vehicle occupant restraint device which is mounted on an interior part of a vehicle having a structural frame member. The restraint device comprises a shock absorbing member connected to the structural frame member and having at least one yielding portion formed thereon, and an impact receiving panel or member secured to the shock absorbing member for receiving force of impact of knee portions of the vehicle occupant applied thereto. In one preferred embodiment, the shock absorbing member has a supporting plate connected to the structural frame member of the vehicle, and leg portions extending from the supporting plate to the impact receiving panel. The shock absorbing member also has a yielding portion formed between the supporting plate and the leg portion so that when an impact force greater than a predetermined value is applied to the impact receiving panel, the yielding portion is deformed to absorb energy of impact of the knee portions of the vehicle occupant applied thereto during a collision. In another preferred embodiment, the shock absorbing member comprises a base plate mounted on the structural frame member and secured to the impact receiving panel, and a corrugated plate attached to the base plate. With this arrangement, if the knee portions of the vehicle occupant strike against the impact receiving panel during a collision of the vehicle, the shock absorbing member yields at an intermediate portion thereby absorbing energy of the impact.

These and other features and advantages of the present invention will become more apparent from the following description when taken in conjunction with the accompanying drawings in which.

Figure 1:
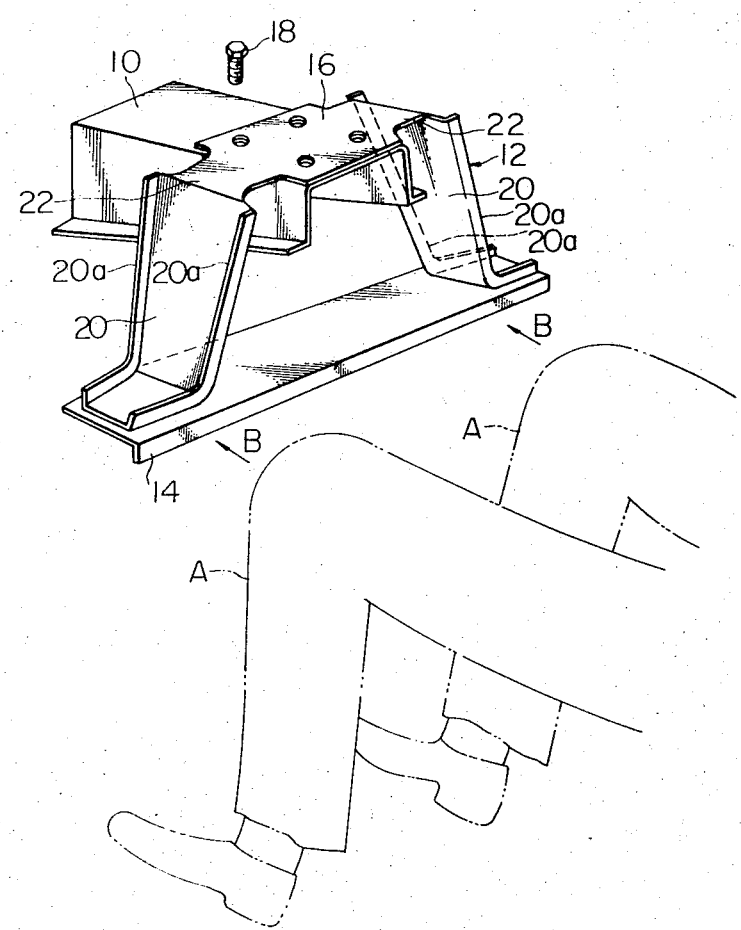
FIG. 1 is a schematic view of one preferred embodiment of a vehicle occupant restraint device according to the present invention.
Figure 2:
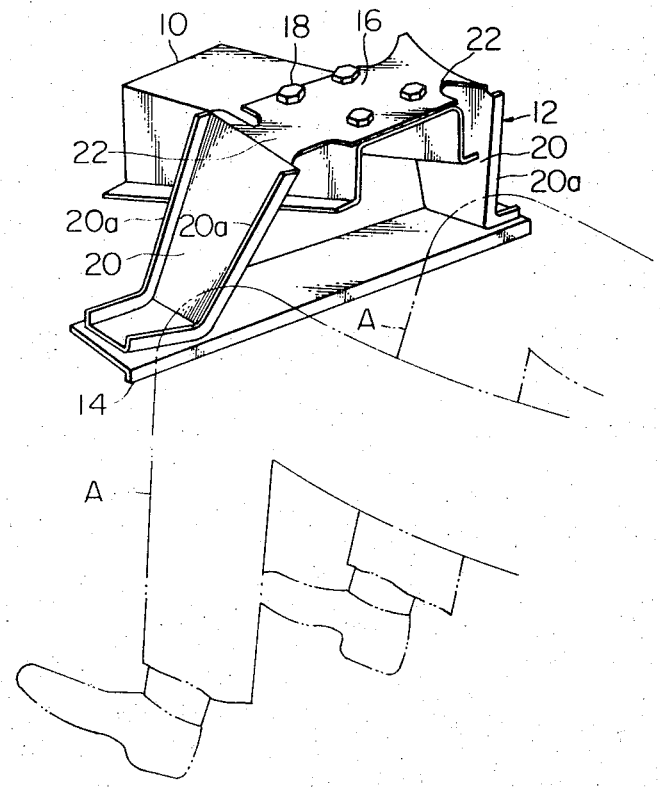
FIG. 2 is a view similar to FIG. 1 but shows the restraint device in an operative condition.

Referring now to FIG. 1, there is shown a portion of a vehicle having a frame member 10, to which the vehicle occupant restraint device according to the present invention is mounted. The vehicle occupant restraint device comprises a shock absorbing member 12 and an impact receiving panel 14 connected to the shock absorbing member 12. In the illustrated embodiment of FIG. 1, the shock absorbing member 12 is shown as being formed in channel shape and including a supporting plate 16 which is secured to the frame member 10 by some suitable fastener such as a bolt 18, and a pair of leg portions extending downward therefrom to which the impact receiving panel 14 is secured. The leg portions 20 have formed on both sides reinforcing flanges 20a. The shock absorbing member 12 also has yielding portions 22 formed outward of the sides of the supporting plate 16 so that, when the knee portions A of a vehicle occupant move forward in a direction shown by arrows B in FIG. 1 during a collision of the vehicle and engage with the impact receiving panel 14, the leg portions 20 of the shock absorbing member 12 are forced forward as shown and accordingly the yielding portions 22 yield thereby absorbing kinetic energy from the vehicle occupant in a manner as shown in FIG. 2. It should be noted that the impact receiving panel 14 may be padded or flat or be of any suitable configuration which will not cause injury to the occupant's knee portions A in case of a collision of the vehicle.

Tests have shown that even if the deflection of the shock absorbing member 12 increases due to forward movement of the occupant's knee portions A, the resistance of the shock absorbing member 12 to the occupant's knee portions A is maintained at a substantially constant value, and consequently the impact force of the vehicle occupant against the shock absorbing member is satisfactorily absorbed.

Figure 3:
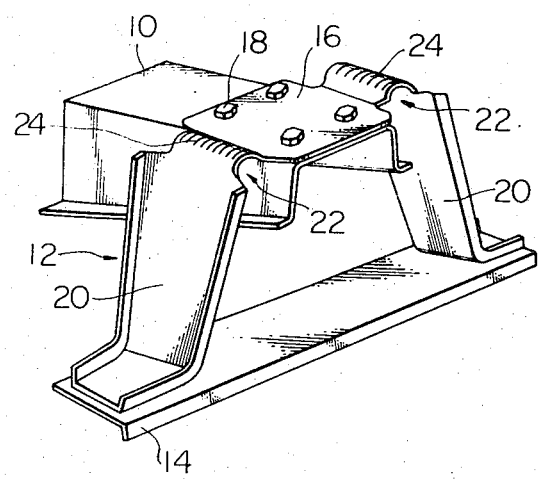
FIG. 3 is a modified form of the vehicle occupant restraint device shown in FIG. 1.

A modified form of the vehicle occupant restraint device embodying the present invention is illustrated in FIG. 3, in which like or corresponding component parts are designated by the same reference numerals as those used in FIG. 1. This embodiment differs from that shown in FIG. 1 in that the yielding portions 22 of the shock absorbing member 12 are formed with corrugations 24, or are curved upward from the plane of the supporting plate 16 and, therefore, a detailed description of the same is herein omitted for the sake of simplicity. With the configuration described hereinabove, the yielding portions 22 smoothly deform to absorb kinetic energy from the vehicle occupant when an impact force greater than a predetermined value is applied thereto and, deformation of the yielding portions continues against a resistance which is substantially constant.

Figure 4:
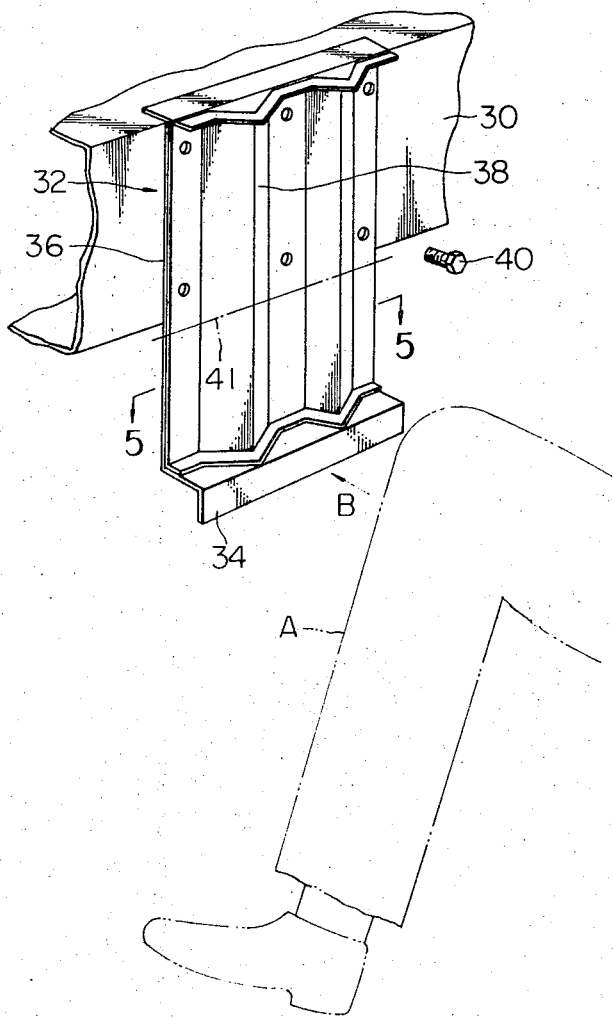
FIG. 4 is a schematic view of another preferred embodiment of a vehicle occupant restraint device according to the present invention.
Figure 5:
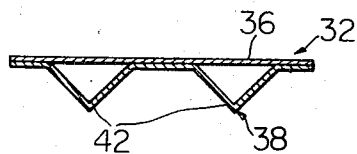
FIG. 5 is an enlarged cross sectional view taken on a line 5—5 of FIG. 4.
Figure 6:
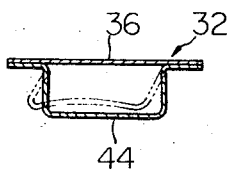
FIG. 6 is an enlarged cross sectional view showing an example of an important part of the restraint device shown in FIG. 4.
Figure 7:
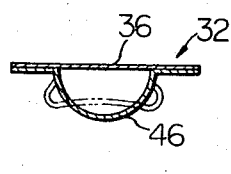
FIG. 7 is an enlarged cross sectional view showing another example of the part of the restraint device shown in FIG. 4.

FIG. 4 shows another preferred embodiment of a vehicle occupant restraint device according to the present invention. In this illustrated embodiment, the vehicle occupant restraint device is shown as mounted on a frame member 30 which extends laterally. The restraint device comprises a shock absorbing member 32 connected to the frame member 30, and an impact receiving panel 34 integral with the shock absorbing member 32. As best shown in FIGS. 4 and 5, the shock absorbing member 32 includes a flat base plate 36 and a corrugated plate 38 fastened to the base plate 36 by some suitable means such as welding. As previously mentioned, the shock absorbing member 32 thus arranged is attached at its upper portion to the frame member 30 by some suitable fastener such as bolts 40 and is connected at its lower end to the impact receiving panel 34 by welding. The impact receiving member 34 may be padded to minimize injury to the vehicle occupant's knee portions A during a collision. With the configuration described hereinabove, if the occupant's knee portions A move in the direction of the arrows B in FIG. 4 and engage with the impact receiving panel 34, the shock absorbing member 32 is biased forwardly of the drawing and thus the shock absorbing member 32 is subjected to a bending moment. Consequently, the shock absorbing member 32 is bent at a position shown by a phantom line 41 in FIG. 4 adjacent to the lower edge of the frame member 30 thereby absorbing impact energy from the vehicle occupant during a collision of the vehicle. It will be appreciated in this instance that, if the corrugated plate 38 has a triangular section 42, this section is maintained in the course of bending of the shock absorbing member 32 due to its inherent geometric configuration. Tests have shown that where the corrugated plate 38 has a rectangular section 44 or semi-circular section 46 as shown in FIGS. 6 and 7, these sections will deform as shown in phantom in FIGS. 6 and 7 when the shock absorbing member 32 is bent at the line 41 in FIG. 4 and its effective second moment of area is significantly decreased, whereas that of the triangular section is not significantly varied during bending of the shock absorbing member 32 and the bending resistance thereof is substantially constant during deformation.

Figure 8:
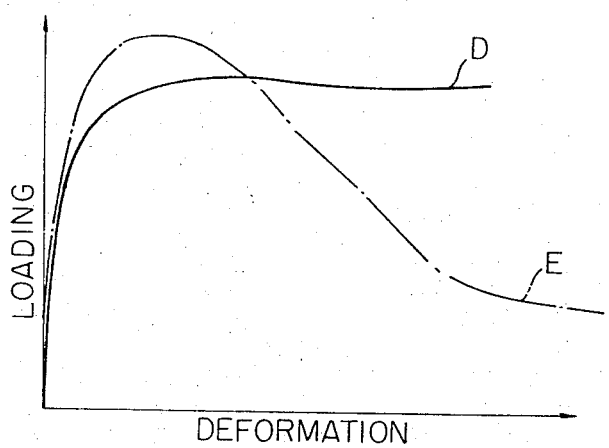
FIG. 8 is a graph illustrating the relationship between the deflection of a shock absorbing member forming a part of the restraint device shown in FIG. 4 and the loading applied thereto.

FIG. 8 illustrates the relationship between the loading applied to the shock absorbing member 32 or its resistance thereto and the deflection of the shock absorbing member 32 during bending. In FIG. 8, a curve D represents a shock absorbing member 32 in which the corrugated plate 38 has a triangular section, and a curve E represents the shock absorbing member 32 in which the corrugated plate 38 has a rectangular section.

It will now be understood from the foregoing description that the restraint device embodying the present invention utilizes deformation of a shock absorbing member for thereby satisfactorily absorbing kinetic nergy from a vehicle occupant during a collision of a vehicle.

It will also be noted that the restraint device of the present invention has a shock absorbing member which is arranged to deform against a resistance which is substantially constant whereby a vehicle occupant is satisfactorily protected from injury during a collision of a vehicle.

It will further be appreciated that the restraint device of the present invention is simple in construction, ready to be install on interior part of a vehicle and economical to manufacture.

While various preferred embodiments of the restraint device according to the present invention have been shown and described, it should be born in mind that such embodiments are by way of illustration only and that various changes or modifications can be made in the described embodiments.

What is claimed is:

1. A restraint device for a vehicle having a rigid frame member disposed in front of a passenger in the vehicle, said device restraining the movement of the passenger during rapid deceleration, said device comprising a shock absorbing member including a base plate secured to the frame member and extending vertically downwardly therefrom and a corrugated plate substantially coextensive with and securely attached to said base plate with the corrugations extending vertically therealong, and an impact receiving member attached to the free bottom end of and extending transversely of said shock absorbing member to receive the force of impact of the knees of the passenger during rapid deceleration whereby the shock absorbing member is deformed along a line transversely of the downwardly extending corrugations.

2. A restraint device as claimed in claim 1 wherein said base plate is flat and the corrugated plate is disposed on the side facing the passenger.

3. A restraint device as claimed in claim 1 wherein the corrugations of said corrugated plate are substantially triangular in cross section.

* * * * *